(12) United States Patent
Akcasu

(10) Patent No.: US 10,599,909 B2
(45) Date of Patent: Mar. 24, 2020

(54) ELECTRONIC DEVICE AND METHOD FOR NON-CONTACT CAPACITIVE AND OPTICAL PIN HOLE FINGERPRINT DETECTION

(71) Applicant: UltResFP, LLC, Austin, TX (US)

(72) Inventor: Osman Ersed Akcasu, Cardiff-by-the-Sea, CA (US)

(73) Assignee: UlTResFP, LLC, Austin, TX (US)

(*) Notice: Subject to any disclaimer, the term of this patent is extended or adjusted under 35 U.S.C. 154(b) by 51 days.

(21) Appl. No.: 16/057,677

(22) Filed: Aug. 7, 2018

(65) Prior Publication Data

US 2020/0050829 A1 Feb. 13, 2020

(51) Int. Cl.
*G06K 9/28* (2006.01)
*G06K 9/00* (2006.01)
*G06F 3/044* (2006.01)
*G06F 3/041* (2006.01)

(52) U.S. Cl.
CPC ......... *G06K 9/00087* (2013.01); *G06F 3/044* (2013.01); *G06F 3/0412* (2013.01); *G06K 9/0004* (2013.01)

(58) Field of Classification Search
CPC . G06K 9/00033; G06K 9/0004–00046; G06K 9/00006–0012
See application file for complete search history.

(56) References Cited

U.S. PATENT DOCUMENTS

| 4,924,085 A * | 5/1990 | Kato | A61B 5/1172 250/227.28 |
|---|---|---|---|
| 8,913,170 B1 | 12/2014 | Baldwin | |
| 2009/0074263 A1 | 3/2009 | Higuchi | |
| 2009/0232362 A1 | 9/2009 | Otsubo | |
| 2013/0147743 A1 | 6/2013 | Ludwig | |
| 2015/0205992 A1 * | 7/2015 | Rowe | G06K 9/2018 382/124 |
| 2016/0321493 A1 * | 11/2016 | Pope | G06K 9/00013 |
| 2017/0032169 A1 * | 2/2017 | Pi | G06K 9/00013 |
| 2017/0125889 A1 * | 5/2017 | Pascolini | G06K 9/00006 |
| 2017/0161543 A1 | 6/2017 | Smith et al. | |
| 2017/0193270 A1 | 7/2017 | Zhang | |
| 2017/0262720 A1 * | 9/2017 | Hwang | G06K 9/0002 |
| 2018/0005030 A1 * | 1/2018 | Jiang | G06K 9/0002 |
| 2019/0034020 A1 * | 1/2019 | He | G02F 1/13338 |
| 2019/0236329 A1 * | 8/2019 | Zhang | G02F 1/13306 |
| 2019/0266376 A1 * | 8/2019 | He | G06K 9/00046 |

* cited by examiner

*Primary Examiner* — Brian Werner
(74) *Attorney, Agent, or Firm* — Law Office of Gerald Maliszewski; Gerald Maliszewski

(57) ABSTRACT

An electronic device and method are provided having an optical image sensor and a capacitive proximity sensor. A pin hole opening within a ring electrode of the capacitive proximity sensor is integrated into and used by the optical sensor. Inner and outer electrodes of the ring electrode can be centered about the pin hole opening and spaced apart to perform capacitive proximity detection of a live finger. When brought in proximity to the ring electrode, the finger can be imaged using the present integrated capacitive proximity sensor with an optical sensing mechanism that utilizes the pin hole to not only allow for micro-imaging of an object, such as a finger, but also to provide high resolution fingerprint comparison and blood oxyhemoglobin saturation comparison for biometric control and access to an electronic device, such as a mobile phone.

22 Claims, 10 Drawing Sheets

ELECTRONIC DEVICE AND METHOD FOR NON-CONTACT CAPACITIVE AND OPTICAL PIN HOLE FINGERPRINT DETECTION

BACKGROUND

1. Field of the Invention

This invention relates to the field of electronic devices and, more particularly, to capacitive and optical fingerprint detection.

2. Description of the Relevant Art

The following descriptions and examples are provided as background only, and are intended to reveal information that is believed to be of possible relevance to the present preferred embodiments. No admission is necessarily intended, or should be construed, that any of the following information constitutes prior art impacting the patentable character of the subject matter claimed herein.

Fingerprint detection and matching is a reliable and widely used technique for personal identification or verification. A common approach to fingerprint identification can include scanning a sample fingerprint, or an image thereof, and comparing the scanned fingerprint to a pre-existing stored fingerprint. If the fingerprints match, proper identification of a person can be made to identify or verify that person.

In order to properly identify, verify and most importantly to authenticate a person, a sufficient amount of that person's fingerprint must be stored. Subsequently, in scanning the sample fingerprint, the same area must be identified and compared. All of the necessary peaks and valleys of the finger must be stored and subsequently sampled sufficient to discern it is the same fingerprint but also to ensure it is distinguishable from another person. When used herein, "fingerprint" is the entire surface area of peaks and valleys of a finger, preferably a single finger, needed to distinguish that finger and specifically the user of that finger from another. If the area stored and later scanned is too small, then verification is insufficient, even though comparison is more readily taken. A fingerprint is therefore most of not all if a single finger needed for identification, verification and authentication.

Oftentimes, fingerprint identification and verification falls in the category of biometric authentication. Biometric authentication is a common technique for allowing a user to access a restricted area, or also to access his or her electronic device. Instead of, or in addition to, a Personal Identification Number (PIN) passcode or password entered onto the touch screen display of an electronic device, fingerprint detection as well as other biometric readings can be taken. Nowadays more and more electronic devices, and especially personal electronic devices, are using fingerprint detection to gain access to the personal information contained therein. The most popular personal electronic devices that use fingerprint access include portable electronic devices, such as mobile phones, tablet personal computers, and the like. Because some portable electronic devices are relatively small, there are significant challenges in using the mechanisms involved in fingerprint detection.

A popular fingerprint detection mechanism is one that uses a capacitive sensor. When verification is needed for a relatively slim electronic device, such as a mobile phone, the capacitive sensor is typically placed under the on/off button where the thickness of the dielectric overlay of the button is relatively thin. While having a thin overlay increases capacitive sensitivity needed to discern capacitance between fingerprint peaks and valleys, the dimension of the on/off button may be insufficiently small in that not enough of the fingerprint is captured for proper verification. As mobile phone electronic devices trend towards the edgeless display, the capacitive fingerprint sensor is generally placed in the display area but beneath an area of the display having a small cutout. The cutout is needed since the touch screen display cover is too thick thereby rendering capacitive sensitivity non-feasible.

Examples of capacitive fingerprint sensors, both linear as well as two-dimensional (array) are described in U.S. Pat. Pub. 2012/0134549 and U.S. Pat. No. 8,803,258, herein incorporated by reference. As a linear capacitive sensor, the finger is generally swiped across the sensor, or vice-versa, to capture only a partial image, followed by fairly complex two-dimensional reconstruction of the entire fingerprint. As an array capacitive sensor, the array of sensors require detailed sense traces and sense electrodes incapable of resolutions below a few hundred microns. Also, most if not all capacitive sensors require actual contact of a user's finger with the sufficiently thin cutout within the cover or above the on/off button in order to accurately detect and verify an entire fingerprint.

Due to the shortcomings of many capacitive sensors, another type of fingerprint detection known as optoelectronic, or simply optical, image sensors have gained in popularity. Optical image sensors typically convert optical signals, such as light that can be either invisible or visible, into electrical signals. A description of an optical image sensor based on Complementary Metal Oxide Semiconductor (CMOS) or Charge Coupled Device (CCD) imaging is described in U.S. Pat. Pub. 2015/0369661, herein incorporated by reference. Conventional optical fingerprint sensors are typically either non-focusing or focusing fingerprint sensors. Focusing optical sensors require a greater thickness since light that is emitted from a light source must reach a triangular prism and traverse multiple refractions as well as reflections from the finger before read on the CMOS or CCD optical image sensor. The triangular prisms and optical lenses required to implement the focus generally have a long optical path, seldom used in the relatively slim mobile phone market. Non-focusing optical fingerprint sensors are more readily used in mobile phones, or slim electronic devices. However, in order to capture a fingerprint image having a size needed for verification, non-focusing optical sensors utilize an array of pixels as well as corresponding pin holes. Requiring a mask layer having a plurality of pin hole openings, each with an overlying and corresponding display pixel, significantly adds to the overall complexity and cost of manufacture. Moreover, the non-focusing optical sensors that utilize an array of pin holes and associated micro-lenses in the pixel display also requires finger contact on the cover of the mobile phone electronic device due to the non-overlapping sensitivity of the array. See, for example, U.S. Pat. Pub. 2018/0046837, herein incorporated by reference.

Even though superior to focusing optical sensors, non-focusing optical sensors and their associated array of pin holes, micro-lenses, and finger contact prove to be less than desirable for fingerprint detection and verification in the slim portable electronic device market. Each time a finger is brought in contact with the cover, the prior peaks and valleys of that fingerprint, possibly from another user, are at least partially left behind. Thereafter, when the next verification is needed and the next fingerprint is to be detected, the residual left behind on the cover can deleteriously affect the current optical readings. Light emitted from the light source, whether visible or invisible (e.g., infrared or ultraviolet), are partially refracted or shifted from the residue left on the cover. Optical sensitivity and resolution can thereby be impacted whenever subsequent fingerprint verification is needed for the purpose of, for example, unlocking the mobile phone electronic device.

SUMMARY

Embodiments of the present disclosure describe using the benefits of a capacitive sensor with that of a specific type of optical sensor, without the detriments of each. According to one embodiment, the present capacitive sensor is integrated into the optical sensors within an electronic device to detect and verify a fingerprint. The capacitive and optical sensors are configured to sense a fingerprint area of sufficient size needed for verification without bringing that fingerprint, and specifically the user's finger from which a fingerprint is to be taken, in contact with the electronic device or the cover of the device.

The integrated capacitive and optical sensors incorporated into the electronic device have components of one being used by the other. For example, the electrode of the capacitive sensor can be shaped as a ring having a single pin hole opening centered within the ring. The ring is conductive for detecting capacitance of a finger brought in proximity to the electronic device. The pin hole can serve as an adjustable light aperture through which all light reflected from the finger passes onto the optical sensor. Integrating both the capacitive sensor and the optical sensor into the electronic device, and using components for one sensing mechanism for that of the other significantly reduces manufacturing costs and allows for use in a relatively small and thin electronic device, such as mobile phone or tablet.

The capacitive sensor can be arranged below a relatively thick cover, and a cutout is not needed for in-display capacitive readings. For example, the capacitive sensor can be placed beneath a cover that can be made of glass, with the glass cover possibly being greater than 500 microns. The capacitive sensor is used solely to detect the presence of, or proximity of, a finger. The capacitive sensor hereof is not used to capture a fingerprint, or the peak and valley detail of a finger for the purpose of distinguishing one fingerprint from that of another. Instead, the capacitive sensor is used solely to detect the presence of an actual finger. For example, to detect details of peaks and valleys of a fingerprint, sensitivity needed can range in the order of ato Farad ($aF=10^{-18}$ F) for a 100-200 micron thick glass cover, which is difficult to obtain for relative thick covers exceeding 500 microns of mobile phones. The present capacitive sensor used only to detect the presence of a live finger, or the distance between a live finger and the ring electrode, only requires less than one femto Farad ($fF=10^{-15}$ F) sensitivity. Moreover, sensing the presence of a finger avoids using a costly array of electrodes placed below cutouts in the electronic device cover, or beneath the on/off switch of conventional designs.

Having a single pin hole opening through a conductive ring electrode allows maximized capacitive readings when the finger is placed directly over the ring, and thus directly over the pin hole opening. As the finger is brought closer to the cover, capacitive reading values increase until they are maximized when the finger touches the cover directly over the ring. Before contacting the cover, when the capacitive reading is above a minimum threshold amount, the capacitive sensor does not sense peaks and valleys of the fingerprint but instead measures simply the presence of a finger within range to trigger the optical sensing mechanism. Unlike conventional focusing optical sensors, the present optical sensor does not utilize triangular prisms or refractions of light. The present optical sensor is a non-focusing optical sensor that purposefully avoids using an array of pin holes, micro lenses and finger contact on the cover due to the shortened focal depth of each pin hole within an array so as not to overlap. The present optical sensor uses only a single non-focusing pin hole opening that avoids finger contact on the cover when taking in-focus optical image readings of the entire fingerprint peaks and valleys. Using a ring electrode for finger detection integrated with a single pin hole for fingerprint detection, allows for optimal triggering of the optical sensor when the fingerprint is properly located and in focus above the cover and not touching the cover. Sensing finger proximity at the proper position above the pin hole while not touching the cover above the pin hole triggers the optical sensor mechanism (emitters and detectors) at the proper moment for maximum resolution of the peaks and valleys while preferably not touching the cover and leaving fingerprint residue for the next reading.

According to one embodiment of the present disclosure, an electronic device is provided. The electronic device includes an optical image sensor, a transparent cover, and a single pin hole opening within a masked layer between the optical image sensor and the transparent cover. The single pin hole opening is in the axial center of a ring electrode that is coplanar with the mask layer. Light reflected from a finger placement area arranged a spaced distance above the cover, passes through the single pin hole opening and onto the optical image sensor. The cover therefore preferably comprises an optically transmissive material, and the finger placement area is preferably the entire area of a single finger needed for an identifiable sample fingerprint. The single pin hole opening is also preferably the only opening within the mask layer, such that all light that passes onto the optical image sensor from the sample fingerprint goes through that single pin hole opening.

According to another embodiment, an electronic device is provided in which the single pin hole opening is arranged between the optical image sensor and a transparent or light transmissive cover. Light reflected from a finger spaced above, and not in contact with the cover, passes onto the optical image sensor for taking the entirety of the sample fingerprint. All light needed for taking the entirety of the sample fingerprint passes at substantially the same time at each distance from the pin hole opening and, as the finger is brought closer to the cover, successive reflections are taken and successive corresponding images are taken yet with all light sent through the single pin hole opening.

According to yet a further embodiment, the electronic device not only includes an optical image sensor, a capacitive proximity sensor, a pin hole opening, but also includes a memory and a processor. The memory can contain a stored fingerprint, such as the fingerprint of user A. Thereafter, when user A wishes to access his or her electronic device, preferably a small and relatively slim electronic device, such a mobile phone, user A brings his or her finger in spaced proximity from the cover of the electronic device for triggering the optical sensor and, through the single pin hole opening the entire fingerprint is sampled in succession as the finger is brought closer to the electronic device above the pin hole. That sample fingerprint, taken at a maximum resolution and focus at one of the imaging distances above the pin hole can then be compared to the stored fingerprint. If those fingerprints match, which they should if they were both taken from user A, then the electronic device can be unlocked. If and only if the fingerprints match, will the processor send the requisite command to unlock the electronic device, thereby allowing the user access to, for example, stored application programs available on the touch screen display, cellular, WiFi, Bluetooth, etc., voice and data communication.

According to yet a further embodiment, the electronic device further includes a light emitter operable from the capacitive sensor to produce light only when the capacitance measured on the ring electrode increases above a minimum threshold value. The emitter turns off when the measured capacitance reaches a maximum threshold value, that value obtained when the finger touches the cover. The light emitter produces light onto the finger and, like the optical sensor, the emitter continues producing light, with the optical sensor sensing the reflected light continuously as the finger moves toward the cover. Again, both can be deactivated when the finger touches the cover, unless other biometric readings such as oxygen content are taken.

The light produced and sensed is preferably visible light, but can also include both visible and invisible light. The invisible light can be infrared, whereas the visible light can be in almost any chromaticity color spectrum. For example, if infrared is used, the visible light can be in the red spectrum. The combination of visible and invisible light reflected from a user's fingerprint and sent through the single pin hole opening produces a subcutaneous image of a live finger. A live finger is an actual finger of a user, and not a finger of a cadaver or a photograph of a fingerprint. The capacitive sensor can detect capacitance on the electrically conductive and charge storing ring electrode resulting from a grounded live finger of a person brought in proximity to the electrode. The present integrated capacitive and optical sensors, therefore, have dual security anti-spoofing features. The presence of a grounded or charged live finger having its unique capacitive readings taken from the ring electrode is distinctively different from capacitive readings taken from a photograph, for example. The capacitive sensor thereby provides the first anti-spoofing functionality, whereas the subcutaneous, blood oximetry, etc. optical sensing provides the second anti-spoofing functionality. Both combine to form a dual security, non-contact fingerprint detection mechanism.

BRIEF DESCRIPTION OF THE DRAWINGS

Other objects and advantages of the invention will become apparent upon reading the following detailed description and upon reference to the accompanying drawings.

Figure 1:
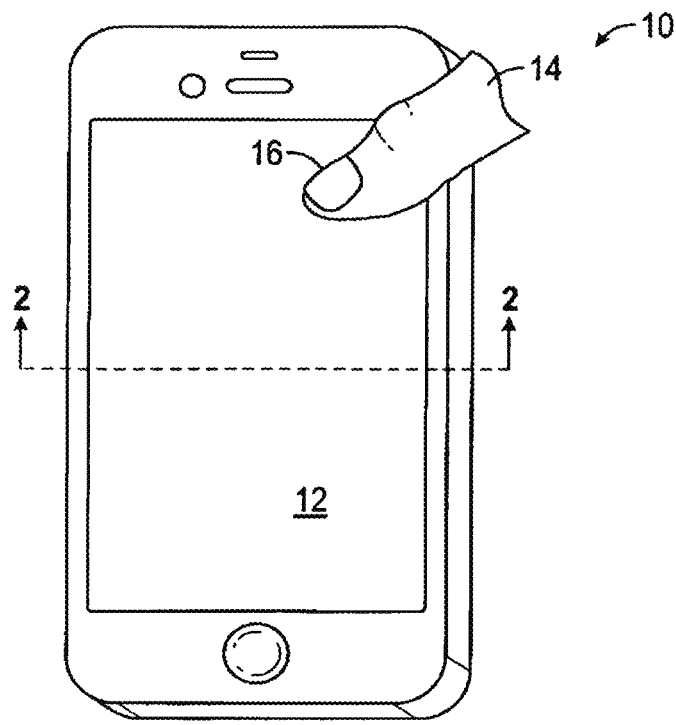
FIG. 1 is a plan view of an electronic device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 illustrates an electronic device 10. In particular, electronic device 10 is a low profile, relatively small size, preferably portable electronic device. Popular such electronic devices include ones that are relatively slim, and less than, for example, 5-8 mm in thickness. A mobile phone or a tablet are examples of such electronic devices shown having a cover 12 configured over a touch-sensitive display. The display, as well as the cover are on a front-side surface of electronic device 10. The display preferably includes a Graphical User Interface (GUI) that can respond to finger-touch. For example, if the electronic device 10 is a mobile phone, or "smart" phone, there are objects on the display allowing a user to place a cellular call, receive a call, send and receive data, and launch application programs, for example.

The cover placed over the display is preferably transparent, translucent and/or transmissive to light, both visible and invisible light. Not all of cover 12 need be light transparent, as long as at least a portion of cover 12 is light transparent. The portion of cover 12 that is light transparent is configured to receive light from an emitter directed upon a finger, and reflected from that finger back onto the electronic device 10 and through cover 12 for fingerprint detection. As shown in FIG. 1, finger 14 can be arranged over a portion of the front-side surface of cover 12, and specifically over a pin-hole opening 16 within electronic device 10.

Popular slim electronic devices, less than 5 mm in thickness, are ones having an edgeless display. Moreover, the transparent cover of many such electronic devices 10 comprise glass, sometimes known as "gorilla glass". Glass of cover 12 in the popular mobile phone market, while light transparent, must be relatively thick in order to protect the underlying display. For example, the display glass cover of most modern smart phones has a thickness greater than 500 microns. Cover 12 of the present electronic device 10 is one that need not be cut out or selectively thinned. No matter where pin hole 16 exists beneath cover 12, fingerprint detection can occur without modifying the relatively thick glass of 500 microns above that pin hole opening 16. Accordingly, a fingerprint can be taken anywhere along the display, for edgeless displays covered by a relatively thick (greater than 500 microns) glass cover 12 to achieve in-display fingerprint detection. Conventional capacitive fingerprint detection cannot be achieved for in-display arrangement, since the intermediate cover thickness is simply too thick to discern the fringing field changes correlated to the peaks and valleys of a fingerprint, whether brought in contact with cover 12 or not.

Figure 2:
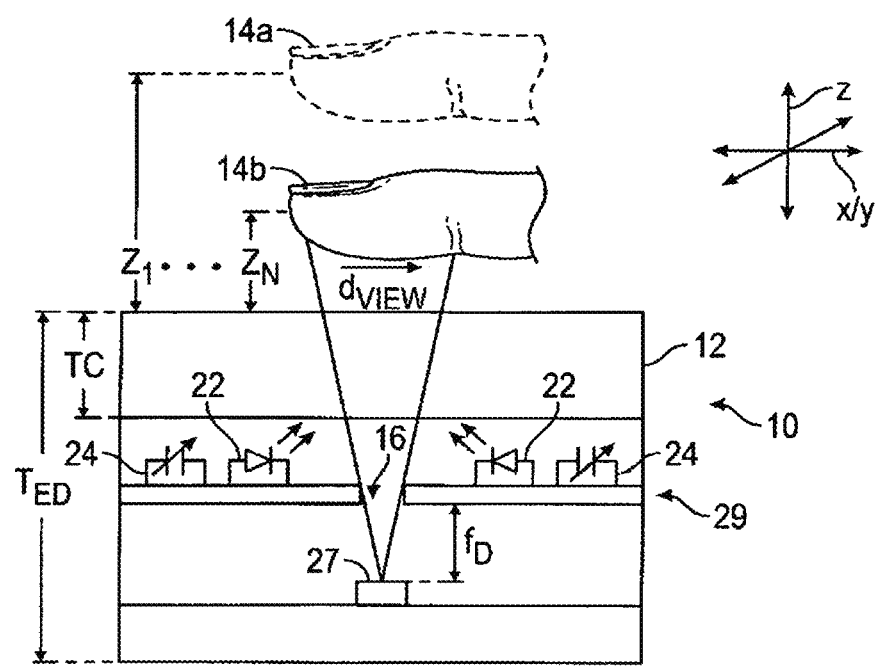
FIG. 2 is the electronic device shown along plane 2-2 of FIG. 1.

Turning now to FIG. 2, electronic device 10 is shown along plane 2-2 of FIG. 1. For sake of brevity in the drawing, not all components of electronic device 10 are shown. However, the key components are shown. Electronic device 10, in addition to cover 12 and pin hole opening 16, also includes the key components of a camera module 27 having an optical image sensor 20 (shown in FIG. 5a), at least one and preferably two emitters 22, and a variable capacitor 24, and specifically a capacitance ring electrode 26. (shown in FIG. 4).

Image sensor 20 includes an Integrated Circuit (IC) substrate, and image sensing circuitry carried by the IC substrate. Popular optical image circuitry includes a CMOS or CCD imaging array, oftentimes simply referred to as a CMOS or CCD image capture camera. A popular CMOS camera is one obtainable from Asia Optical, having a pixel size of approximately 3 microns×3 microns with an effective focal length of approximately 5 mm.

A popular emitter 22 used to direct light onto finger 14 includes one or more Light Emitting Diodes (LEDs), which can be part of the display. The light emitted can be at least visible light. However, if a second LED is used, then the second LED can emit invisible light, such as Infra Red (IR). IR light from one LED may penetrate deeper within a user's finger 14 compared to other colors of light, for example, visible light of blue chromaticity. It may be desirable that the IR emitter 22 be synchronized with the visible light emitter 22, and also synchronized with the optical image sensor 20 for signal acquisition of an optical image, such as a fingerprint, as well as other biometric data of a live finger.

Figure 4:
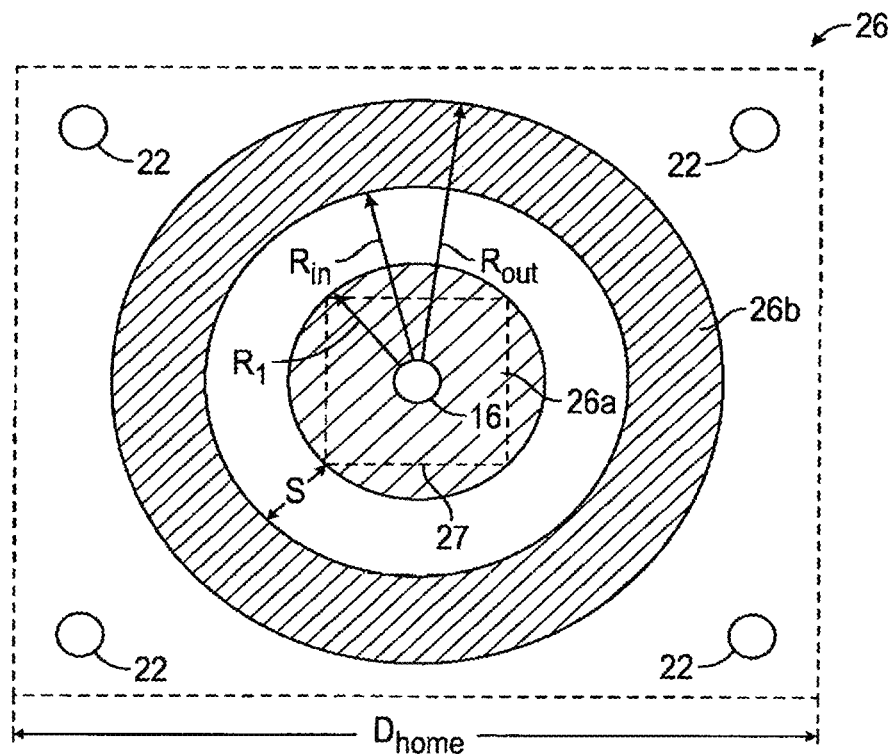
FIG. 4 is a top view of the ring electrode of the capacitive sensor centered about a pin hole opening through which light passes from a finger to the optical sensor.

Capacitive sensors 24 preferably have selective sensitivity, and are generally referred to as LC-based, variable sensitivity capacitive sensors 24. Proximity capacitive sensors 24 are capable of reading capacitances less than 1 femto Farad ($10^{-15}$ F) detect the proximity of finger 14. Capacitive sensors 24 are therefore known as proximity sensors that can utilize capacitance-to-digital conversion circuitry based on, for example, an LC resonator sensor. A conductive sensor plate or ring electrode 26, as shown in FIG. 4, can be made of a conductive material, such as metal and including aluminum or copper, or can be made of a semi-conductive material that is selectively rendered either transparent or opaque depending on a charge or voltage applied.

As a proximity capacitive sensor 24, when a finger 14 approaches cover 12 of electronic device 10 and, specifically, the ring electrode 26 (FIG. 4) in plane 29, a change in capacitance occurs which translates to a change in frequency that can be measured on the LC resonator sensor. The fixed inductor and fixed capacitor, and specifically the ring electrode 26 of the fixed capacitor can change to a variable capacitor 24. The ring electrode 26 not only sets the baseline oscillation frequency of the capacitive sensor 24 but also changes the frequency that can be measured dependent on the proximity of finger 14 to that variable conductive ring electrode 26.

A popular yet conventional capacitive proximity sensor is available from Texas Instruments, part number FDC2x1y. Though conventional LC-based capacitive proximity sensors prove adequate at measuring peaks and valleys in the micron range of resolution, they are nonetheless inadequate at measuring or detecting fingerprint of the in-display, relatively thick covers of modern-day portable electronic devices 10. Thus, while LC-based capacitive proximity sensors can be used in the present embodiment, they are purposefully not used for detecting peaks and valleys of a fingerprint. Instead, they are used solely to determine the presence or proximity of a finger 14. Typical LC-based capacitive proximity sensors require contact of finger 14 onto cover 12, albeit a cutout or on/off region of cover 12. The present embodiment neither requires capacitive fingerprint detection, nor does it require any modification to cover 12. The present LC-based capacitive proximity sensor 24 thereby operates to detect only presence of a finger 14 when finger 14 is properly positioned above yet not in contact with electronic device 10 and, specifically, cover 12 of electronic device 10.

Also shown in FIG. 2 is the preferred thickness $T_{ED}$ of an electronic device being less than approximately 5 mm. Also, the preferred thickness for cover 12, shown as $T_C$ is that which exceeds 500 microns and, can exceed more than 1000 microns.

Yet further shown in FIG. 2, and described further herein below, the purpose of the capacitive sensor 24 is to detect when finger 14 is brought in position preferably centered directly above pin hole 16 and optical image sensor 20. Detection of the proper position involves measuring the capacitance between finger 14 and sensor 24. A live finger of living tissue connected to a person's body will measure a different capacitance than a reproduction, such as just a finger itself not connected to a body from, e.g., a cadaver, or a photograph or paper reproduction of a live finger. Because the capacitive plate within plane 29 is a ring with its central axis aligned with the central axis of a pin hole 16 and optical image sensor 20, the capacitance value increases as finger 14 is brought along the x y plane directly above and along the z axis aligned with that central axis. Capacitance continues to increase as finger 14 is moved from position 14a to position 14b closer towards cover 12 along the z axis co-linear with the central axis. It is when the capacitance value exceeds a predetermined minimum threshold are emitters 22 and optical image sensor 20 activated. Further description of the increased capacitance from $z_1$ to zn in the z axis, co-linear with the central axis, and the continuous light emission and detection process is described further in FIG. 7.

Figure 3:
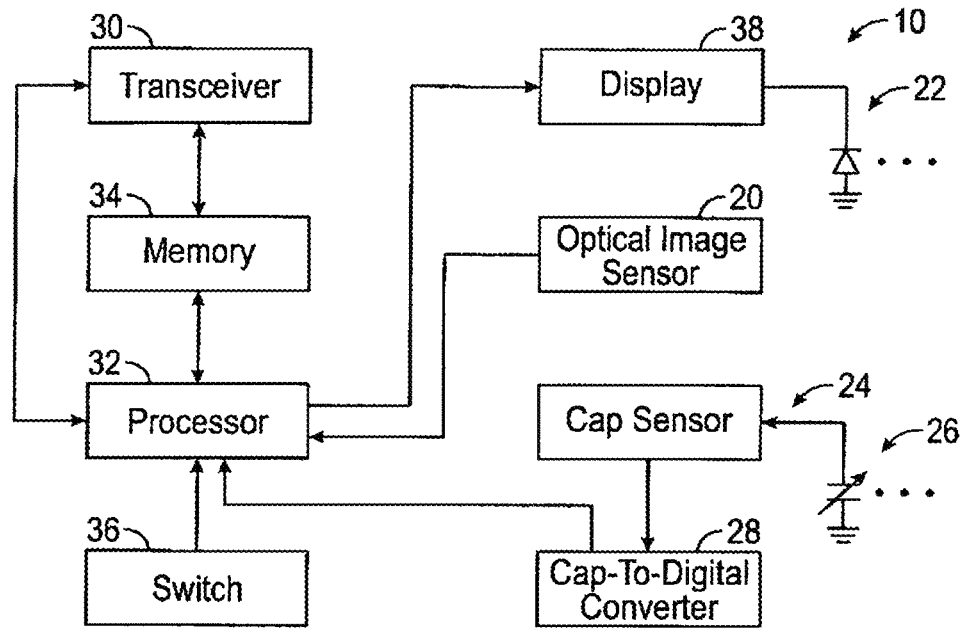
FIG. 3 is a block diagram of the electronic device of FIG. 1 having both capacitive and optical sensors.

Turning now to FIG. 3, a block diagram of the various components of an electronic device 10 is shown. Within the housing of the preferred portable electronic device 10 includes a wireless transceiver 30, along with processor 32, memory 34, on/off switch 36, display 38. Electronic device may further include an optical image sensor 20 and a capacitive proximity sensor 22. As noted in FIGS. 1 and 2, display 38 is preferably a touch display, with a cover 12 over display 38. Incorporated into display 38 is one or more emitters 22. Transceiver 30, also carried within the housing of electronic device 10, is coupled to a processor 32, as well as memory 34. Transceiver 30 cooperates with processor 32 and memory 34 to perform at least one wireless communication function, for example, for transmission of voice and/or data.

Memory 34 is configured for storing finger matching biometric template data, for example. Memory 34 can also store other or additional types of data. Processor 32 cooperates with transceiver 30 and memory 34, but also cooperates with display 38 to, for example, show a menu of available software applications based upon pressing or input to the touch display.

As noted above, the capacitive proximity sensor 24 is purposefully designed so as not to detect ridges and valleys of a fingerprint, but instead senses only the proximity of a finger for triggering the optical image sensor, that includes both optical image sensor 20 as well as the light emitter or emitters 22. Capacitive proximity sensor 24 includes a variable capacitive plate, or ring electrode 26, as well as a capacitor-to-digital converter 28.

Figure 7:
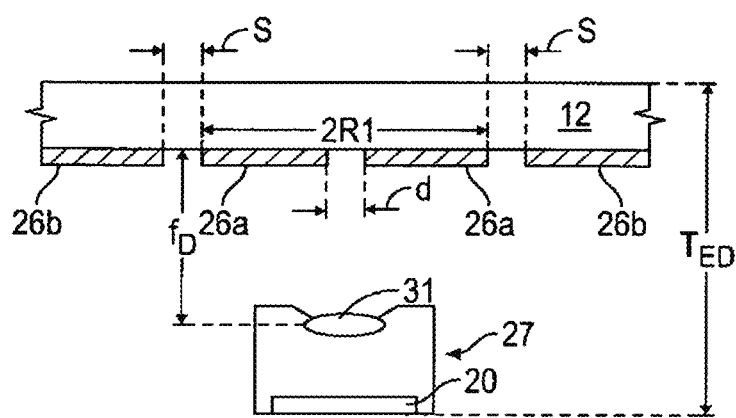
FIG. 7 is an actual experimental schematic assembly of the integrated capacitive proximity sensor and pin hole optical system having a patterned, conductive and opaque ring electrode formed on an iPhone glass cover with the camera module and related geometry configured below the pin hole integrated within the ring electrode central axis.

Referring to FIG. 4, the capacitive ring electrode 26 is configured in plane 29 (FIG. 2) as a conductive and opaque layer preferably patterned upon a surface of cover 12. Ring electrode 26 comprises an inner electrode 26a that surrounds pin hole 16. Coplanar within the inner electrode 26a is an outer electrode 26b that surrounds a spaced distance S from inner electrode 26a. The ring electrode 26 therefore comprises concentric rings 26a and 26b, centered around pin hole 16 and configured above a camera module 27, shown in dashed line. Within camera module 27, or between camera module 27 and ring electrode 26 is at least one optical emitter, or LED 22. The camera module 27, shown in more detail in FIG. 7 is preferably below the home button, which can comprise the on/off button, or possibly arranged elsewhere below the cover if the mobile device does not have a separate on/off button. The camera module 27 is preferably square in the x/y plane and between 5 to 8 mm per side, whereas the home button, or home area, is a slightly larger square $D_{HOME}$ of approximately 10 mm per side, also in the x/y plane, but spaced in a plane above the camera module x/y plane.

The inner electrode 26a outer circumference preferably has an outer radius of R1 and the outer electrode 26b outer circumference preferably has an outer radius of Rout, signifying the outer radius of the entire ring electrode 26. A space of s denotes radial distance between the conductive the inner electrode 26a and outer electrode 26b.

Although not shown in FIG. 4, but shown in FIG. 7, camera module 27 can also include the optical sensor, or CCD 20 and a lens 31 spaced over the sensor 20. Enough fingerprint area $d_{VIEW}$ is necessary for verification and, as such, must be captured. As noted in FIG. 5a, $d_{VIEW}$ indicates the diameter of the area of the finger the camera module 27 can see, and signifies the importance of selecting the appropriate pin hole diameter d value which, from that value, determines the focal depth $f_D$. See also, FIG. 6a. Using the Rayleigh formula, $$d = 2\sqrt{f_D \cdot \lambda} \text{ where } f_D \leq t_{ED}$$

where λ is the wavelength of the light traversing the pin hole 16 and, of course, $f_D$ is the focal length from the pin hole to the optical image sensor, viewed as the perpendicular distance from the pin hole plane where the sharpest image would occur. For visible light, the wavelength range λ in nm ($10^{-9}$ m) is given by, $$380 \leq \lambda \leq 780 \text{ nm}$$

Focal depth $f_D$ then becomes, $$f_D = \frac{d^2}{4\lambda}$$

Figure 5A:
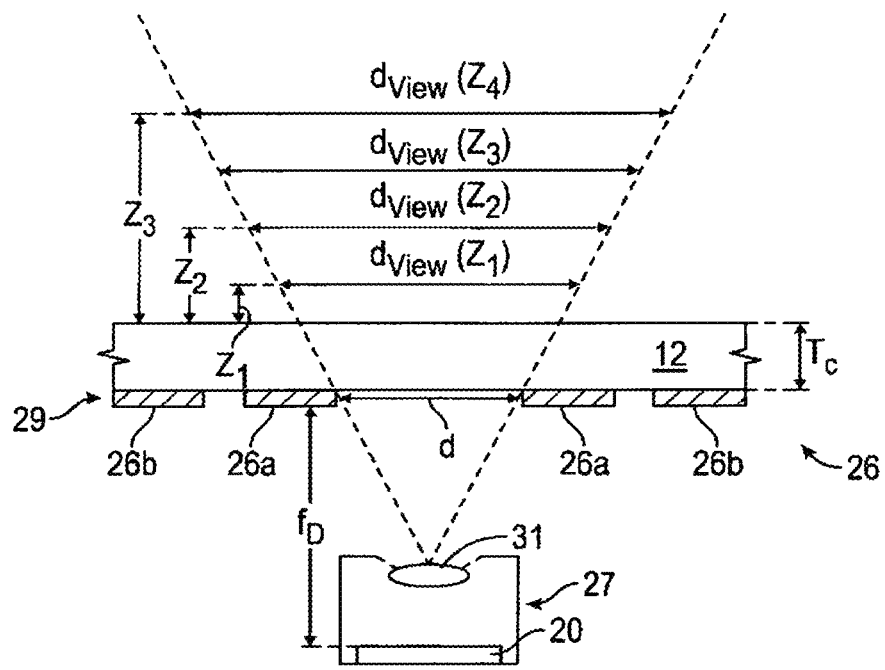
FIG. 5a is a partial cross-sectional view of the ring electrode on or below a glass cover, and a camera module with an image sensor below the ring electrode as an optical sensor integrated with the capacitive proximity sensor and related geometry for the ray optics trigonometric derivations.

FIG. 5a is a cross-sectional side view of the ring electrode 26, and shows different $d_{VIEW}$ areas depending on the distance between the finger and the surface of the cover glass 12. The patterned ring electrode 26, having inner and outer rings 26a and 26b, is formed by conventional deposition, masking and etch back techniques on one surface of cover 12. The cover 12 is approximately 500 microns. The patterned rings can be made of, for example, aluminum to a thickness of approximately 0.5 microns. The index of refraction for the glass cover 12 can be approximately 1.5, whereas the index of refraction for air above and below the glass cover 12 is approximately 1.0. Thus, as the optical image of the fingerprint traverses cover 12, that image undergoes refraction at each air/cover interface.

Figure 5B:
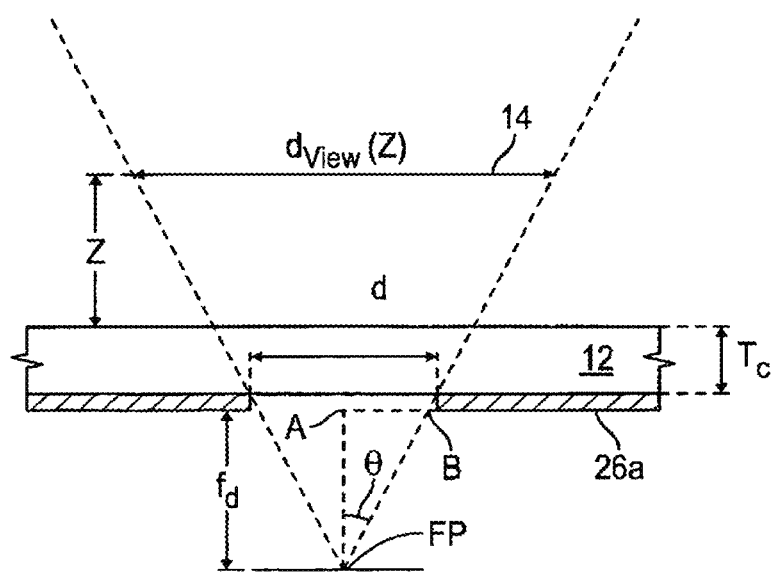
FIG. 5b is a partial cross-sectional view of the pin hole geometry for the ray optics trigonometric derivations.

FIG. 5b is a partial cross-sectional side view of the inner ring 26a and the relationship between the distance z from the pin hole 16 to the finger, as well as the pin hole 16 diameter d, wavelength of emitted light being reflected λ, focal length $f_D$, thickness of the cover $t_C$ and $d_{VIEW}$, to form an approximation:

$$d_{VIEW} \cong \frac{4\lambda}{d}(z + f_D)$$

Figure 6A:
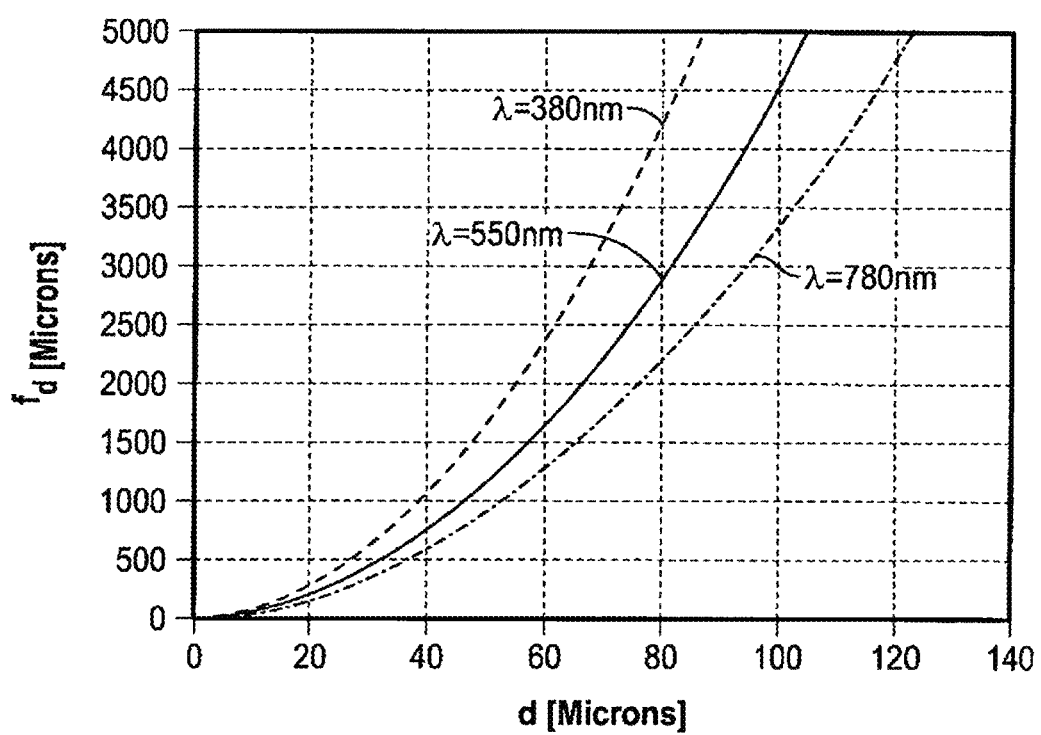
FIG. 6a is a graph of the pin hole diameter versus focal depth for the optical sensor in a linear-linear axis.
Figure 6B:
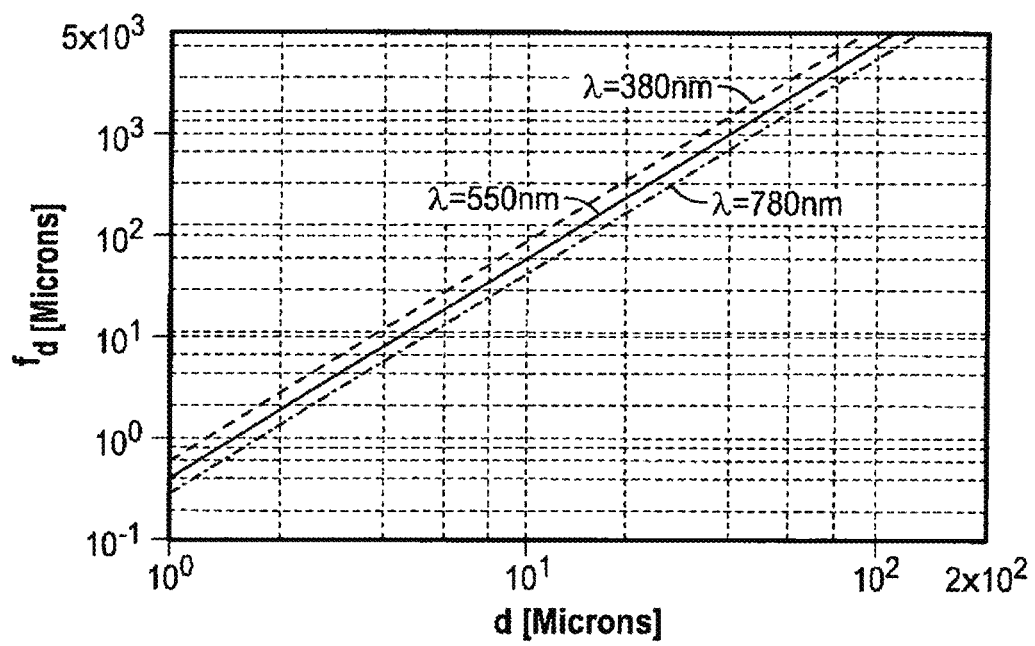
FIG. 6b is a graph of the pin hole diameter versus focal depth for the optical sensor in a logarithmic-logarithmic axis to demonstrate relative small y versus x values.

FIG. 6a illustrates the relationship between focal depth $f_D$ within plane 29 to the upper surface of the optical image sensor 20, as shown in FIG. 2, versus pin hole 16 diameter d in linear relationship. FIG. 6b illustrates the same function and relationship but in log-log scale respectively for 380, 550 and 780 nm of wavelengths corresponding to different colors such as violet, blue, green, yellow, orange and red. As can be seen for the focal depth to be less than the electronic device thickness, in this case the smart phone thickness $t_{ED}$ of 5 mm, or $5 \times 10^3$, the pin hole diameter must be in the order of 100 microns or less.

Depending upon the wavelength of light reflected from the fingerprint onto the optical image sensor 20 via pin hole 16, $f_D$ increases quadratically relative to pin hole diameter d. Applying ray optics to FIG. 5a and FIG. 5b, an approximation can be made between the diameter of the fingerprint image that can be viewed at the CCD sensor 20 image plane. As noted below, the ray optics calculations can be based on the tangent θ relation at the right-angled triangle bound by focal point (FP), and points A and B in FIG. 5b to provide:

$$tc(\theta) = \frac{d}{2f_d} = \frac{d}{2\left(\frac{d^2}{4\lambda}\right)} = \frac{2\lambda}{d}$$

The combination of pin hole 16 and optical image sensor 20 forms a pin hole camera system having a specific field of view diameter necessary to capture the entire fingerprint $d_{VIEW}$. Assuming that there is no refraction along the optical path, $d_{VIEW}$ can be computed as:

$$d_{VIEW} = \frac{4\lambda}{d}(z_n + t_G + f_D)$$

where z is the distance between cover 12 and the finger 14 captured as $d_{VIEW}$, and $t_C$ (or $t_G$) is the thickness of the glass cover 12, and of course, $f_D$ is the focal length and d is the pin hole diameter. Assuming Zn=0, if the finger were to touch the cover and $t_G$ is approximately 500 microns, knowing the thickness of the electronic device constrains focal length to be much less than 5000 microns if the finger is touching cover 12, the finger may be in focus but the image detected by optical image sensor 20 will only display a circular area of the finger with a diameter $d_{VIEW}$ of approximately 30 microns with sufficient clarity. Unfortunately, a larger diameter of the finger $d_{VIEW}$ for fingerprint recognition purposes is needed. To have a large enough $d_{VIEW}$ such as 0.5 to 1 cm, the finger must be distanced from cover 12, and that distance z must be in the order of 1 cm. One can get pin hole diameter d solving for finger to glass cover distance $z_n$ of 1-2 cm.

For example, a single off-the-shelf smart phone camera, with correctly placed pin hole 16 with a correctly calculated pin hole diameter d placed behind the cover glass thickness of 5000-1000 micron thickness or even greater, can capture in 0.5-1 cm diameter in-focus high resolution image of a finger under normal indoor illumination conditions. The image capture system hereof can also fit within a 5 mm smart phone thickness. Also, the above approximations for the image capture system are adequate for a system with just a CCD imager with no optics in front of the optical sensor 20. A smart phone camera module has at least one micro lens in front of its high-resolution CCD imager which has 2-5 micron pixel dimensions. Smart phones having three micro lens optics are common. Since the above expressions do not take any of the effects presented by the refractive optics present in the camera module, experimental approach to determine the proper pin hole diameter is necessary but such expressions provide a sufficient starting point for the experimental procedure.

The experimental approach shown in FIG. 7 is based on having 0.5 micron metal ring electrode 26 with inner and outer rings 26a and 26b deposited on a standard mobile electronic device glass cover 12. A standard mobile electronic device can include an iPhone having a glass cover 12 of 500 micron thickness. The 0.5 micron aluminum is opaque to visible light and various diameter pin holes with concentric ring structures patterned and etched therein. The thickness of the iPhone is measured at $t_{ED}$ of 5-8 mm, and the thickness of the camera module 27 is less than the thickness of the iPhone, with a diameter of the image sensor 20 being approximately 7.5 mm. The diameter of the outer circumference of the inner electrode 26a is 2R1 (FIG. 4), and is larger than the diameter of the image sensor.

Figure 8:
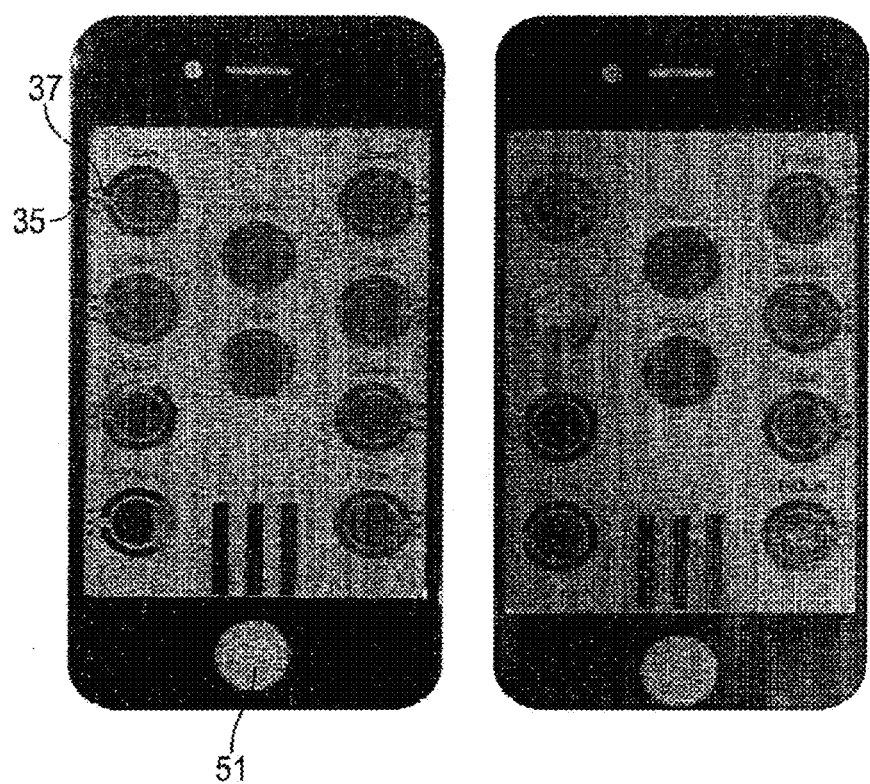
FIG. 8 contains photographs of two mobile phones, such as iPhone, and the glass cover of the mobile phones retrofitted with different size pin holes, with the integrated capacitive proximity electrodes used to select the best pin hole giving the highest quality image from 1 cm distance from the cover glass within the 5 mm mobile phone thickness. The photograph of the on the left shows an iPhone glass cover with pin hole diameters ranging from 5-40 microns and the photograph on the right shows an iPhone glass cover with pin hole diameters ranging from 60-200 microns.

FIG. 8 shows the two different mobile phones, e.g., iPhones with home on/off button 51, each having with their covers retrofitted with eight pin holes 16. The pin hole diameters d for the left-hand iPhone has 5, 10, 15, 20, 25, 30, 35 and 40 microns in the inner electrode ring 26a as terminal 1 and with and outer ring structure as terminal 2. The second photo on the right shows iPhone glass cover having pin holes 16 with diameters of 60, 80, 100, 140, 160, 180 and 200 microns. The pin holes, being quite small are difficult to see but are in the center of the inner electrode 26a, with the inner electrode 26a electrically connected 35 to terminal 1 and the outer electrode 26b electrically connected 37 to terminal 2. The pads 35 and 37 are for connecting the two concentric rings 26a and 26b to the capacitive proximity detector. The retrofitted mobile phone is shown having a camera module beneath the appropriate pinhole, separate and apart from the mobile phone normal camera. Depending on the appropriate pin hole diameter chosen from the exemplary, and experimental set of pin holes shown in FIG. 8, different print images can be obtained to show a fingerprint, whereas the normal camera of a mobile phone that does not employ a pin hole cannot obtain. A photograph of the mobile phones was taken of the integrated pin hole 16 and capacitive proximity detector electrodes retrofitted to an Apple iPhone 4 glass cover.

The patterned glass cover 12 is placed on top of a smart phone camera module connected electrically to the smartphone with an extender ribbon. Smart phone electronics is used to display the fingerprint images yet obtained through the properly configured focal length and pin hole diameter of the experimental retrofitted mobile phone of FIG. 8, as shown in FIGS. 9a-9d.

Figure 9A:
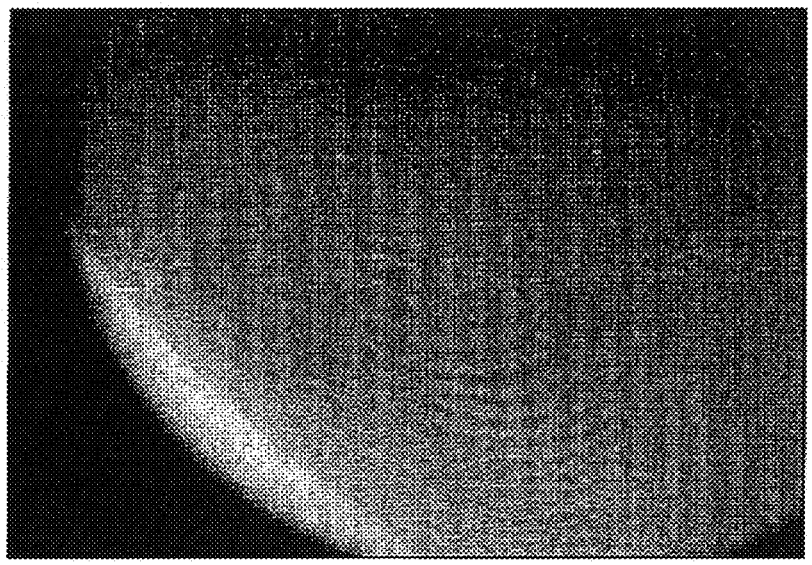
FIG. 9a is an actual optical image taken of a finger approximately 12 mm from the glass cover using the integrated capacitive proximity sensor and optical pin hole arrangement with no back side LED illumination and in a 400 lux ambient illumination to obtain image resolution of 3 microns×3 microns.
Figure 9B:
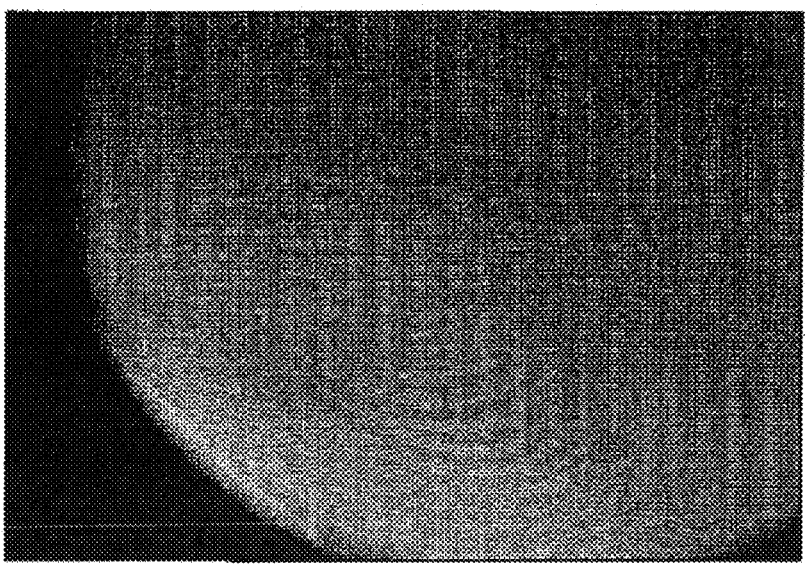
FIG. 9b is an actual optical image taken of a finger approximately 10 mm from the glass cover using the integrated capacitive proximity sensor and optical pin hole arrangement with no back side LED illumination and in a 400 lux ambient illumination to obtain image resolution of 3 microns×3 microns.
Figure 9C:
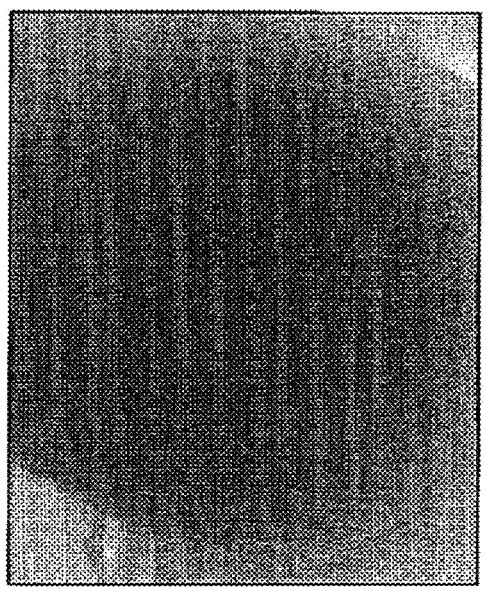
FIG. 9c is an actual optical image taken of a finger approximately 5 mm from the glass cover using the integrated capacitive proximity sensor and optical pin hole arrangement with no back side LED illumination and in a 400 lux ambient illumination to obtain image resolution of 3 microns×3 microns.
Figure 9D:
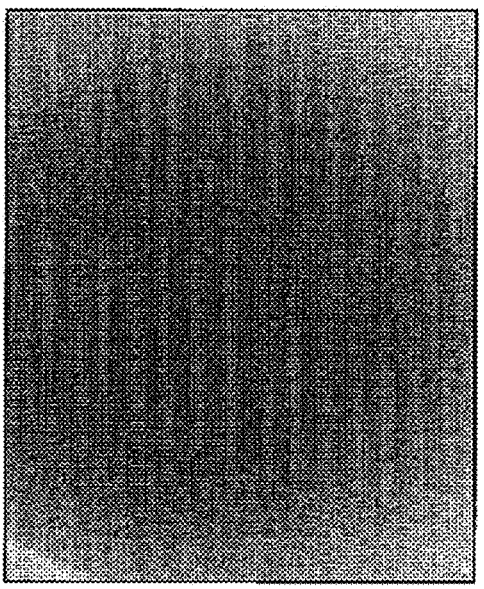
FIG. 9d is an actual optical image taken of a finger approximately 3 mm from the glass cover using the integrated capacitive proximity sensor and optical pin hole arrangement with no back side LED illumination and in a 400 lux ambient illumination to obtain image resolution of 3 microns×3 microns.

FIGS. 9a, 9b, 9c and 9d show actual optical images taken on the CCD image sensor 20 via properly dimensioned pin holes 16 and focal lengths retrofitted to a iPhone, with finger to glass cover 12 distances z of 12 mm (FIG. 9a), 10 mm (FIG. 9b), 5 mm (FIG. 9c) and 3 mm (FIG. 9d). The images were taken with no back side LED illumination, and in accordance with the present invention of using an integrated capacitive proximity sensor with a single pin hole and an optical sensor camera module 27. The finger is only illuminated with normal ambient indoor daylight illumination with light intensity of 500 lux at the finger location. The images shown in FIG. 9a-FIG. 9d achieve 5 micron by 5 micron resolution, 100 times better than the fingerprint standard of 50 by 50 microns and much better than any published fingerprint image produced in a conventional smart phone using a conventional camera module.

Having a pin hole with the proper diameter in front of a standard smart phone camera system as explained in this invention also gives macro photography (extreme close up photography) or even microscopy capability to the smart phone. As an example cameras used for macro photography use expensive, heavy lenses which are 45-200 mm long and can focus from infinity to 18 mm from the object clearly. As can be seen in the actual image shown in FIG. 9d, the fingerprint image is 3 mm away from the glass cover of the iPhone 6 retrofitted in accordance with the present invention.

If optical fingerprint detection is taken in rapid succession from $Z_1$ to Zn, without the finger 14 touching cover 12 and between 8 cm to the closest distance of 1 cm, and entire fingerprint of $d_{VIEW}$ can be taken of, for example, 0.5 to 1 cm in diameter. This assumes that the proper d and $f_D$ is selected.

Knowing that the $t_{ED}$ of a portable electronic device, such as a mobile phone is less than 5 mm, $f_D$ must be less than 5000 microns, and preferably is in the range of 1000 to 2500 microns, for achieving d of approximately 45 to 75 microns, or vice versa. Using the above equation for $d_{VIEW}$, and maintaining capacitive measurements of fingerprint detection of a finger 14 that begins approximately 8 cm from cover 12 and extends downward but does not touch cover 12 and ends detection approximately 1 cm above cover 12 for Zn, and a thickness of the cover glass $t_G$ of approximately 5 mm with the thickness or space $t_S$ between cover 12 and pin hole plane of ring electrode 26 is relatively small if not zero, and at the wavelength ranges described above as well as the d and $f_D$ ranges shown in FIG. 6, $d_{VIEW}$ of an entire fingerprint registered on optical sensor 20 is in the acceptable range of 0.5 to 1 cm for $d_{VIEW}$. The above describes the necessity of doing optical fingerprint detection with the appropriate spacing of the finger above the electronic device 10 as well as the appropriate dimensions for d and $f_D$, but also the appropriate backside illumination for image capture of the reflected light. The latter is accomplished while activating the emitters 22 placed at the periphery of the pin hole opening 16 and/or with backside illumination of the display screen having the ring electrode 26 as mostly a transparent electrode for better illumination through the electrode 26 to the finger 14 by having the capability of placing the emitters 22 closer to the pin hole opening 16.

The second level of security afforded by the dual security optical pin hole fingerprint detection methodology avoids hacking or spoofing in order to gain access to the electronic device. Using the integrated pulse oximetry and heart-rate monitor modules available from, for example, Maxim, part numbers MAX30100 for mobile electronic devices, and also utilizing both red; visible spectrum and infrared; invisible spectrum LEDs. The emission spectrums for the red and IR LED's are (600<λ<700 nm) and (800<λ<900 nm) respectively. There are other types of pulse oximetry and heart-rate monitor modules which are employed in smart watches which use green light (450<λ<490 nm) instead of red (635<λ<700 nm) LED as in MAX30100, wherein the operational principal are the same.

Figure 10:
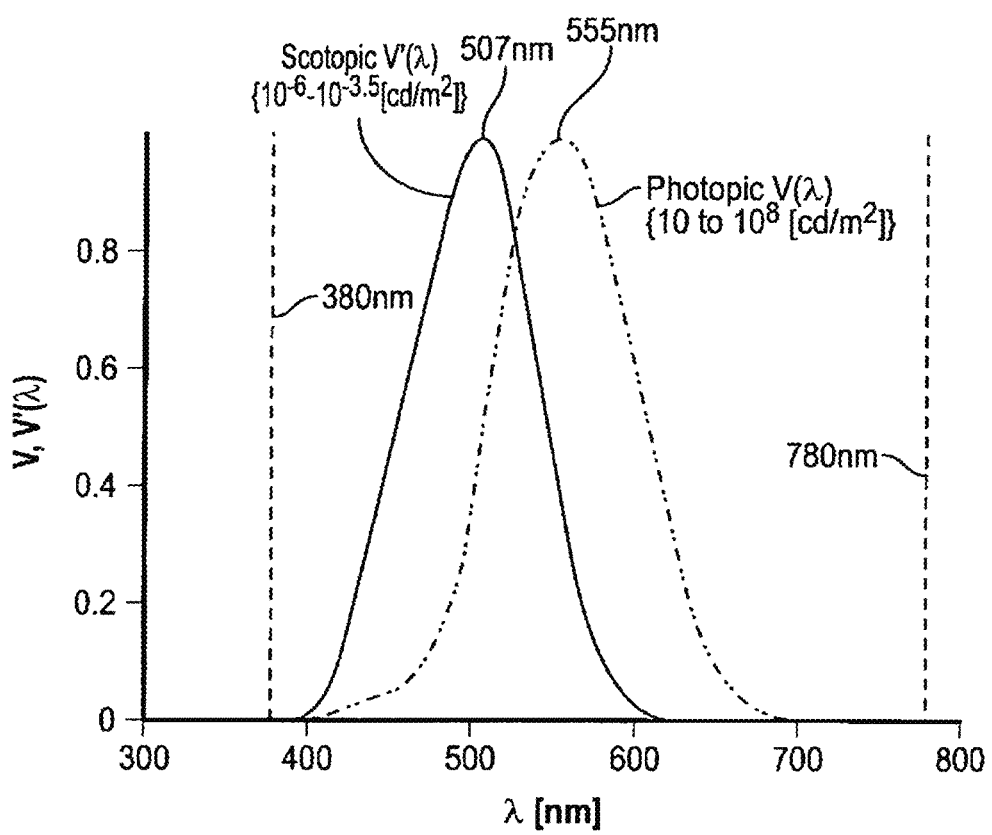
FIG. 10 is a graph of various sensitivities to different wavelengths of luminosity as a function of wavelength in the visible spectrum for photopic and scotopic lighting conditions, wherein photopic conditions cover the light intensity range of 10 to $10^8$ cd/m$^2$ for outdoor daylight and indoor reading and working conditions.

Referring to FIG. 10, as the light intensity goes down like in twilight conditions to the range of $10^{-6}$-$10^{-3.5}$ cd/m² known as scotopic conditions. There is also mesopic level of eye sensitivity which is between photopic and scotopic conditions at luminance level of $10^{-3}$-$10^{0.5}$ cd/m². In the visible spectrum Red, green and blue colors cover (635 nm<λ<700 nm), (560 nm<λ<520 nm) and (450 nm λ<490 nm) of wavelengths respectively. In the invisible range infrared and ultraviolet covers (780 nm<λ<1 mm) and (10 nm<λ<380 nm) respectively.

Colors of LED fall within different wavelengths as shown in FIG. 10. It is useful to know where these light wavelengths actually fall in the visible spectrum. FIG. 10 illustrates the visible spectrum of the human eye and its sensitivity in the visible wavelength range of 380<λ<780 nm for photopic and scotopic lighting conditions. Photopic conditions cover the light intensity range of 10 to $10^8$ cd/m², which covers outdoor daylight and indoor comfortable reading/working conditions. As the light intensity goes down like in twilight conditions to the range of $10^{-6}$-$10^{-3.5}$ cd/m² known as scotopic conditions, the human eye sensitivity peak moves from 555 to 507 nm, from green to bluish. This presents a better adaptation for better vision in twilight conditions and the major reason of energy saving in using LED lighting instead of sodium lights.

A live tissue is red due to blood circulation within the vessels of the live tissue. If the tissue, i.e., finger, is illuminated by two different wavelengths, the wavelengths outside the red and infrared spectrum will be absorbed by the tissue to a greater degree. Therefore the finger is illuminated by the two different wavelength light emitters in sequence, and the relative differences in the absorption and reflection of the light beams at the two different wavelengths from the human tissue at the photodetector receiver, for example, will give the ratio of the oxygenated and deoxygenated blood oxyhemoglobin saturations known as oxygen partial pressure, or $SpO_2$. A live finger oxyhemoglobin saturation for a healthy person must be over 95%. These readings can be performed every 30 milliseconds, which is far less than the duration that the finger is physically brought in proximity to the sensor. The variation of the measured finger oxyhemoglobin as a function of time will give the pulse rate. Since pulse rate for a living human certainly should not be less than 40 beats per minute, accurate heart pulse measurement will require 15 seconds of measurement time, which is longer than desired time for fingerprint image capture. This feature is used for basic health monitoring function of the integrated electro-optical sensor. MAX30102's LED's and its photo-detector center to center is separated by 2.62 mm and the entire semiconductor surface with associated spacing can fit in 1.97 mm×4.424 mm of space, well within the confines of the home button area. MAX30102 also has an IR proximity detector which can be used instead or together with the capacitive proximity detector as explained earlier.

Figure 11:
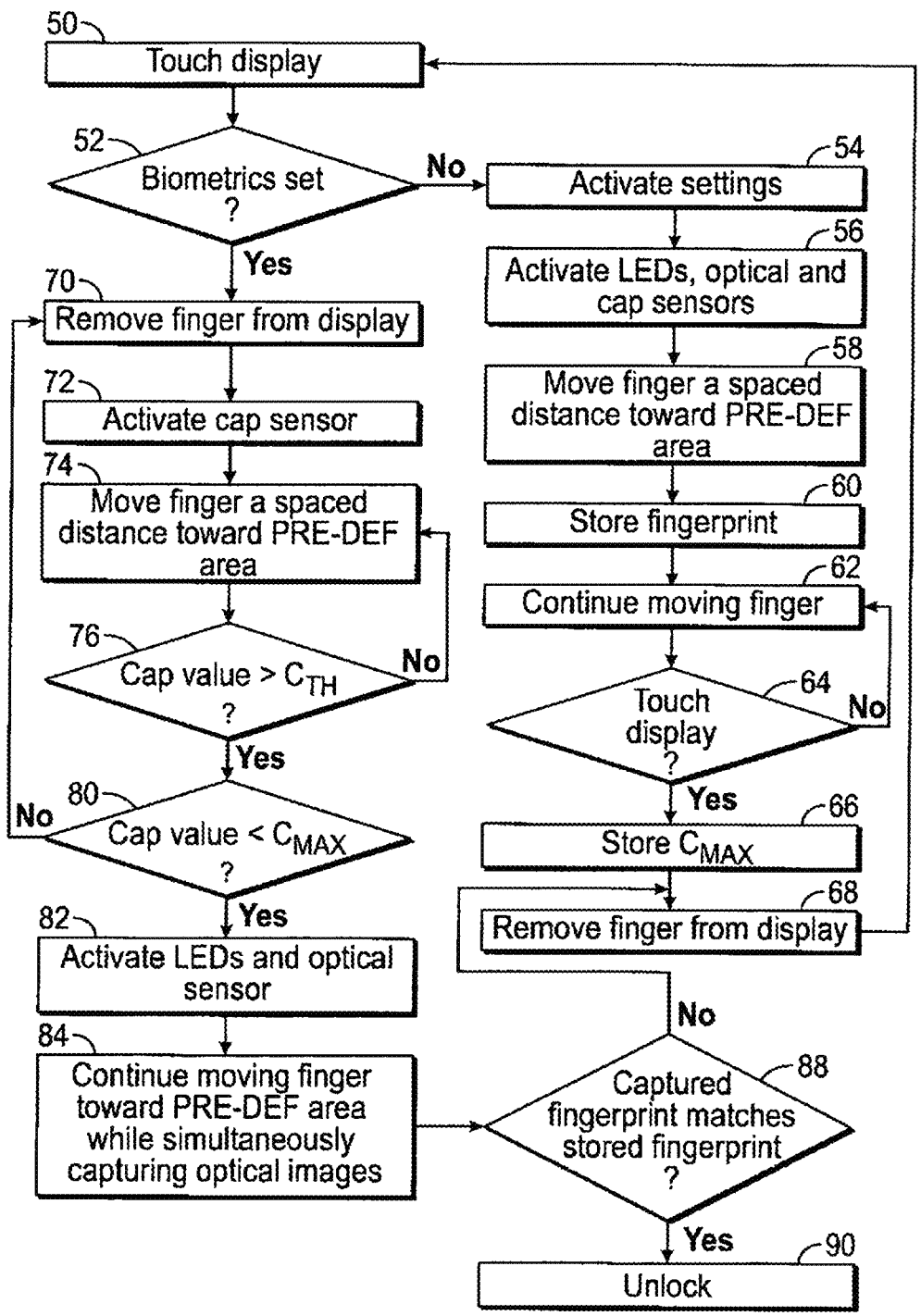
FIG. 11 is a flow diagram of the method for using the capacitive sensor to trigger the optical sensor to capture a fingerprint image absent contacting the cover, display or electronic device with the finger being imaged.

Turning now to FIG. 11, a flow diagram is shown of the method for using the capacitive sensor as well as the optical sensor to capture a fingerprint image, as well as storing a fingerprint image for later comparison. As previously noted, fingerprint area needed for detection and verification is approximately 0.5 to 1.0 cm in diameter, and more preferably nearer 1 cm. A portable electronic device 10 can have multiple choices of security methods, some of which are fingerprint, iris and face recognition, in addition to a simple password or a system of drawing a pattern on a display screen which must match with already stored drawing data to allow the user to securely access the electronic device. The user must select one of the secure access methods from the display screen possibly in a settings menu. According to the preferred embodiments, the fingerprint based secure access system is of importance using fingerprint matching methodology.

Initiating the fingerprint matching methodology begins by, for example, a user touching the electronic device or display 50, such as simply pressing the on/off button. The display may then either prompt the user to bring his or her fingerprint into focus or to set the biometrics 52 if no fingerprint has been previously stored.

If no fingerprint has been previously stored to which the sample fingerprint can be compared, then an activate setting screen may appear 54. This screen will activate the emitters as well as the optical and capacitive sensors 56, prompting the user to move his or her finger a spaced distance towards a pre-defined area 58 of the display. The capacitive sensor will determine when the finger is properly positioned above the cover, and the emitters and optical sensors will then, in succession, illuminate and detect a fingerprint. Once the fingerprint is at the proper $f_D$ corresponding to the proper $d_{VIEW}$, the fingerprint is stored 60.

The finger can continue moving downward toward the cover 62 until it touches the display 64. Once the finger touches the display the maximum capacitance value is stored 66, and then the finger can be removed from the display 68 to end the activate setting sequence as well as the sequence used to store a user's fingerprint as well as the maximum capacitance value when the finger touches the display.

After the fingerprint and maximum capacitance value ($C_{MAX}$) are stored, and therefore the biometrics are set, the users finger can be removed from the display 70. The capacitive proximity sensor is activated 72, and the finger is moved a spaced distance toward the pre-defined area of the display 74. Capacitive readings are taken every few milliseconds depending on the sample frequency of the capacitance-to-digital conversion circuitry. The measurement electronics for such circuitry is approximately less than 10 MHz with measurements in the order of fF (fempto Farad) range every millisecond or less.

As the finger approaches the cover and, more specifically, the ring electrode beneath the cover, the capacitance value will increase. Once the capacitance value exceeds a minimum threshold value of $C_{TH}$ shown at step 76, measurements continue until the capacitance value reaches the previously stored maximum capacitance value $C_{MAX}$. If the capacitance value reaches $C_{MAX}$ 80, then the finger is removed from the display 70. However, readings continue can until that moment and, more importantly, the emitter and optical sensor are activated 82 the moment the capacitance value exceeds $C_{TH}$ until it reaches $C_{MAX}$, as shown by block 82. Thus, as the finger moves toward the cover, and until it touches the cover, capacitive values are taken as well as optical images 84. The present electronic device implements an integrated capacitive sensor and optical sensor methodology by which the capacitive sensors merely detects the presence of the finger within range of the optical sensor, and the optical sensor actually performs the fingerprint detection when the finger is known to be within the optical focal length and $D_{VIEW}$ resolution.

The integrated fingerprint detection methodology can be initiated not only by an indicator on the display, but also by sound or even a recognizable verbal prompt, requesting fingerprint detection initialization. After the user is notified that fingerprint detection is enabled, the user can respond to bring one of his or her designated fingers within range of the electronic device, and specifically the cover, as noted as the response time $T_R$. If a user does not take sufficient action in this period, the system will remain in a locked mode allowing no access to electronic device 10. However, if the user places the designated finger and maintains that finger above the pre-defined area for a sufficient amount of time such as the hold time or $T_H$, electronic fingerprint capture is begun. Typically, the fingerprint capture sequence is preferably performed in less than 1 second. After the fingerprint is successfully captured, electronic device 10 acknowledges that capture to the user by any means of user interface supported by the system. Preferably, one way to display the capture data on an electronic device 10 is that of an image. After the user is acknowledged of the successful electronic fingerprint capture, the user can then lift his or her finger by any desired arbitrary motion to lift the finger away from the display. When the fingerprint is electronically captured, it has to be matched with the previously stored fingerprint data. This requires some processing by the processor, as well as extraction from the memory, which requires a fairly short amount of time, known as processing time, or $T_P$. For better user satisfaction, $T_P$, similar to $T_H$, is less than a second. If the captured fingerprint data matches any of the stored fingerprint data in the system, the system will securely open the electronic device for further actions desired by the user. If the captured fingerprint data does not match any of the stored fingerprint data in the system, the electronic device, via the display, will request another try, or will go back to the original initialization process.

Once the capacitive proximity detector detects that finger is touching the glass cover, the second level of security which is the live finger oxyhemoglobin saturation measurement will be conducted. Live finger oxyhemoglobin saturation for a healthy person must be over 95%. If the measured value is above a set limit, such as 90%, the stored video images will be compared with the ones in the processor memory. If not, then inappropriate access may be occurring and the system will remain locked and a message will be sent informing to use a real live finger.

The process of bringing the finger to the designated pre-defined area requires some aiming of the finger to the designated area. The aiming time depends on the user and varies greatly even for the same user time after time, but it should be a short amount of time, such as less than one second. The various times, such as the aiming time, response time and hold time can be set by the user in the setting menu. Regardless of the aim, response, and hold times, the optical image sensor captures the fingerprint image just as it did when it captured the previously stored fingerprint image. The processor extracts that previously stored fingerprint image from the memory and determines whether the captured fingerprint matches the stored fingerprint 88. If there is a match, then the electronic device is unlocked 90. If there is no match, then the finger is removed from the display 68 and the process can begin again if desired.

Acknowledgement is given to Okyar Atilla, Serdar Buyukustun and Erdem Hokenek for their work in literature survey, experimentation and discussions on photography.

It will be appreciated to those skilled in the art having the benefit of this disclosure, that this invention is believed to provide a non-contact capacitive and optical pin hole fingerprint detection methodology. The invention eliminates the need of cutting undesirable home button hole or reducing the cover thickness in the cover glass of a mobile phone and providing desirable all in screen add-on functionalities to a smart phone. The capacitive sensor however, does not detect a fingerprint as in conventional designs, but instead is used to trigger optical sensing. The optical sensing, using a pin hole integrated into the capacitive sensor allows for fingerprint detection within 5 micron×5 micron resolution, significantly better than conventional mobile phone camera resolution, along with its anti-spoofing capability by measuring blood oxyhemoglobin saturation. Moreover, the optical fingerprint detection, or sensing, is performed when the finger is properly detected at various spaced distances from a cover, where all reflected light directed to the camera module and optical sensor traverses only one pin hole, instead of an array of pin holes as in conventional designs. Using the integrated capacitive and optical sensing devices and methodology, and the incorporation of a pin hole opening of the optical sensor with a ring electrode surrounding the pin hole of a capacitive sensor not only provides ease of manufacture in the integrated configuration but also ensures proper optical resolution as well as dual, anti-spoofing security. Further modifications and alternative embodiments, and various aspects of the invention, will be apparent to those skilled in the art in view of this description. It is intended, therefore, that the following claims be interpreted to embrace all such modifications and changes and, accordingly, the specification and drawings are to be regarded in an illustrative than a restrictive sense.

What is claimed is:

1. An electronic device, comprising:
    an optical image sensor;
    a transparent cover;
    a single pin hole opening within a mask layer between the optical image sensor and the transparent cover, wherein light from a finger placement area passes through the single pin hole opening and onto the optical image sensor; and
    wherein the mask layer comprises a ring electrode of a capacitor arranged coplanar with the mask layer and having the pin hole opening through a central axis of the ring electrode to function as capacitor plates of a capacity proximity detector integrated circuit.

2. The electronic device as recited in claim 1, wherein the transparent cover comprises optically transmissive material.

3. The electronic device as recited in claim 1, wherein the finger placement area is the entire area of a single finger needed for an identifiable sample fingerprint.

4. The electronic device as recited in claim 1, wherein the single pin hole opening is the only opening within the mask layer to allow light to pass onto the optical image sensor.

5. The electronic device as recited in claim 1, wherein the mask layer is arranged in a plane that is parallel to and between the optical image sensor and the transparent cover.

6. The electronic device as recited in claim 1, wherein the ring electrode comprises an inner electrode and an outer electrode spaced outside the inner electrode co-planar with the inner electrode with the optical image sensor directly below the pin hole and centered below the inner electrode.

7. The electronic device as recited in claim 6, wherein the inner and outer electrodes comprise spaced co-planar concentric rings patterned behind the transparent cover and substantially conductive and opaque.

8. The electronic device as recited in claim 1, wherein the ring electrode comprises a patterned conductive layer arranged on the transparent cover.

9. The electronic device as recited in claim 1, further comprising at least one light emitting diode configured to emit light from a periphery outside the optical image sensor and pin hole opening and toward the finger placement area.

10. The electronic device of claim 1, further comprising:
    a plurality of light emitting diodes (LEDs) configured to emit light in at least a first wavelength and a second wavelength; and
    a pulse oximeter to detect reflected LED light emissions and to provide blood oxygen partial pressure measurements.

11. The electronic device of claim 10 wherein the first wavelength is in the visible spectrum and selected from the group consisting of about 550 nanometers (nm) or about 660 nm; and
    wherein the second wavelength is in the infra-red spectrum at about 880 nm.

12. An electronic device, comprising:
    an optical image sensor;
    a cover made of optically transmissive material;
    a single pin hole opening arranged between the optical image sensor and the transparent cover through which all light reflected from a finger spaced above and in non-contact with the transparent cover passes onto the optical image sensor for taking the entirety of a sample fingerprint; and
    wherein the single pin hole opening comprises an aperture through a substantially conductive, planar ring.

13. The electronic device as recited in claim 12, wherein all light that passes onto the image sensor passes through the single pin hole opening.

14. The electronic device as recited in claim 12, wherein all light needed for taking the entirety of a fingerprint passes at substantially the same time through the single pin hole opening.

15. The electronic device as recited in claim 12, wherein the single pin hole opening comprises an aperture through a substantially opaque, planar ring.

16. The electronic device as recited in claim 12, wherein the finger remains a spaced distance from the cover during all times in which the entirety of the sample fingerprint is taken.

17. The electronic device as recited in claim 12, wherein the sample fingerprint is compared to a stored fingerprint to unlock the electronic device.

18. The electronic device of claim 12, further comprising:
    a plurality of light emitting diodes (LEDs) configured to emit light in at least a first wavelength and a second wavelength; and
    a pulse oximeter to detect reflected LED light emissions and to provide blood oxygen partial pressure measurements.

19. The electronic device of claim 18 wherein the first wavelength is in the visible spectrum and selected from the group consisting of about 550 nanometers (nm) or about 660 nm; and
    wherein the second wavelength is in the infra-red spectrum at about 880 nm.

20. A method of using an electronic device, comprising:
    activating a light source to direct light from the electronic device onto a finger arranged a spaced distance from the electronic device;
    capturing light reflected from the finger placement area through a single pin hole opening within a ring electrode and onto an optical image sensor while maintaining the finger a spaced distance from the electronic device;
    comparing a sample fingerprint of the finger to a stored fingerprint; and
    unlocking the electronic device if the sample fingerprint compares favorably to the stored fingerprint.

21. The method as recited in claim 20, wherein said activating comprises turning on the light source, absent touching the electronic device with the finger, whenever a capacitive value read on a capacitor coupled to the electronic device exceeds a pre-defined minimum.

22. The method as recited in claim 20, wherein said activating comprises turning on the light source, absent touching the electronic device with the finger, whenever a capacitive reading on the ring electrode exceeds a predefined minimum.

\* \* \* \* \*

UNITED STATES PATENT AND TRADEMARK OFFICE
CERTIFICATE OF CORRECTION

PATENT NO. : 10,599,909 B2  
APPLICATION NO. : 16/057677  
DATED : March 24, 2020  
INVENTOR(S) : Osman Ersed Akcasu Page 1 of 1

It is certified that error appears in the above-identified patent and that said Letters Patent is hereby corrected as shown below:

On the Title Page

Item (73), the name of the Assignee. The term "UITResFP" should be replaced with the term "UltResFP".

Signed and Sealed this  
Twenty-fourth Day of November, 2020

Andrei Iancu  
*Director of the United States Patent and Trademark Office*